Figure 1:
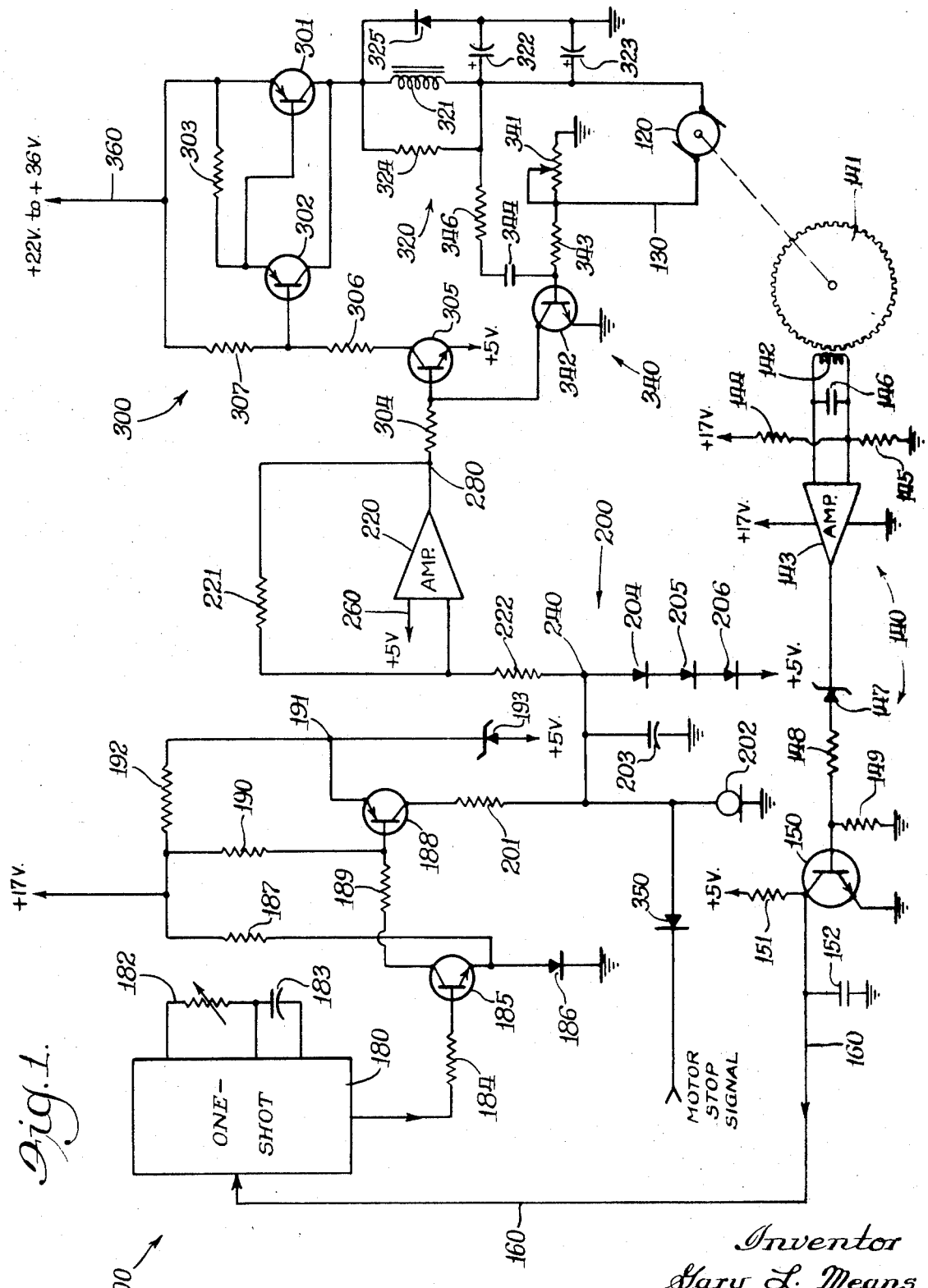

United States Patent

[11] 3,629,677

| [72] | Inventor | Gary L. Means |
| | | Waukegan, Ill. |
| [21] | Appl. No. | 873,470 |
| [22] | Filed | Nov. 3, 1969 |
| [45] | Patented | Dec. 21, 1971 |
| [73] | Assignee | SCM Corporation |
| | | New York, N.Y. |

[54] MOTOR SPEED CONTROL CIRCUIT
8 Claims, 2 Drawing Figs.

[52] U.S. Cl. .................................................. 318/341, 318/327
[51] Int. Cl. ...................................................... H02p 5/16
[50] Field of Search ........................................... 318/326, 327, 341

[56] References Cited
UNITED STATES PATENTS

| 3,223,912 | 12/1965 | Sheheen | 318/341 |
| 3,231,757 | 1/1966 | Rainer | 318/327 |
| 3,234,447 | 2/1966 | Sauber | 318/327 |
| 3,260,912 | 7/1966 | Gregory | 318/341 |
| 3,409,814 | 11/1968 | Azuma | 318/327 |
| 3,411,063 | 11/1968 | Schoonover | 318/326 |
| 3,437,826 | 4/1969 | Kelley | 318/341 |
| 3,508,132 | 4/1970 | Peterson | 318/327 |

Primary Examiner—T. E. Lynch
Assistant Examiner—Thomas Langer
Attorney—Mason, Kolehmainen, Rathburn & Wyss ABSTRACT: An improved circuit for precisely controlling the speed at which a motor rotates and for protecting the motor against excessive current drain. Pulses generated synchronously with rotation of the motor trigger a one-shot. The one-shot generates a nonsymmetrical square wave whose symmetry varies with the rotational speed of the motor. In one embodiment, an integrating circuit then converts this nonsymmetrical square wave into a sawtooth or triangular waveform that includes a DC component proportional in magnitude to the motor rotation speed. This waveform is fed into one input of a differential amplifier. The amplifier generates a continuous output, a pulse width modulated rectangular wave output, or no output, depending upon whether the motor is running below the proper speed, approximately the proper speed, or overspeed. This output is fed to a switching-type current regulator connected in series with the motor.

MOTOR SPEED CONTROL CIRCUIT

The present invention relates to motor speed control systems, and more particularly to systems for maintaining the speed of a motor constant in the face of wide variations in both temperature and loading, as well as wide variations in supply voltage.

In the past, many different systems have been proposed for controlling the speed at which a motor rotates. The simplest of such systems utilizes a centrifugal switch which pulse width modulates the motor current and thus directly controls the speed of the motor. Such systems use electrical switches to make and break the motor current many times a second. These switches deteriorate in time due to electrical arcing. Many attempts have therefore been made to provide an electrical control system containing no moving parts that is simple in its construction, yet that is able to maintain constant motor speed with a high degree of accuracy.

The simplest of such electrical systems uses frequency sensing means to produce a voltage whose amplitude varies with the speed of the motor, and then uses this voltage to control a series regulating element connected in series with the motor. Such systems are highly satisfactory with lightweight motors, that do not draw much power. When a heavy load is drawn by the motor, systems of this type require that a heavy-duty current regulating element be utilized that can dissipate as much power as the motor is delivering. Switching-type regulators are also frequently used. As in the above case, a signal is generated whose amplitude is proportional to the motor speed. This signal is then converted by suitable means into a pulse width modulated waveform which is applied to a switching element connected in series with the motor. By utilizing this design, only a small fraction of the energy which flows to the motor is dissipated in the switching device, and a much higher efficiency is achieved. Units of this type have often proved unsatisfactory because semiconductor elements are highly subject to temperature drift. Severe temperature changes thus can change the speed of a motor controlled by such a circuit. Such control systems also allow some motor speed reduction to occur when a motor is subjected to a heavier load.

An improved arrangement uses a combined frequency and phase control system to produce good control of the motor speed. This arrangement is far more complex than the simple arrangement described above, and requires a stable source of reference pulses with which to synchronize the rotation of the motor. This arrangement also requires circuitry for switching over from frequency control to phase control when the motor is close to speed. Systems of this type may provide good control of motor speed when they operate properly, but are occasionally subject to servo loop problems, such as hunting, when the phase control system fails to lock properly. This type of system is also excessively costly for most applications.

A primary object of the present invention is therefore the obtention of a simplified motor speed control system which is able to accurately control the rotational speed of a motor even in the face of severe changes in both loading and operating temperature, as well as wide variations in supply voltage.

A further object of the present invention is to provide such a system that does not require the use of an external frequency standard.

Another object of the present invention is to provide a system which supplies full power to the motor when the motor rotates too slowly, no power to the motor when the motor rotates too rapidly, and that is able to supply exactly the right amount of power to the motor so as to keep it running at the right speed.

In accordance with these and many other objects, the present invention comprises briefly a motor speed control system that includes a one-shot multivibrator, an integrating circuit or low-pass filter, triangle or sawtooth wave generating means, and a switching-type regulator. The motor is equipped with a sensor that generates signals whose frequency is proportional to motor speed. The signals trigger the one-shot multivibrator and cause the generation of a pulse width modulated waveform at the output of the one-shot. In one embodiment this waveform is partially integrated by the integrating circuit so that it becomes a DC signal proportional to the motor speed upon which is superimposed a low amplitude triangular waveform. A differential amplifier is then used to compare the partially integrated waveform with a fixed voltage reference signal. In another embodiment an external generator is used to provide a sawtooth or a triangular waveform which is fed into one of the amplifier inputs. In both embodiments, the differential amplifier output signal is then suitable for direct application to the switching-type regulator. The switching regulator is an electronic switch which connects the motor across a source of operating potential.

When the motor is running below its normal speed, the DC signal at the output of the integrator is of such a low magnitude that the differential amplifier continuously holds the switching regulator in a conductive state, and maximum current is supplied to the motor. When the motor speed is approximately right, the DC signal at the output of the integrator is approximately equal to the reference voltage fed into the other input of the differential amplifier. The low amplitude triangular or sawtooth waveform then causes the differential amplifier to generate a pulse width modulated rectangular waveform for application to the switching regulator. This waveform provides precise control of the current amplitude that reaches the motor and automatically adjusts the motor current to stabilize the motor speed. If the motor is rotating at overspeed, the DC signal at the output of the integrator rises to such a value that the differential amplifier keeps the switching regulator continuously nonconductive and thereby totally deprives the motor of current.

Many other objects and advantages of the present invention will become apparent in the following description, and the features of novelty which characterize the present invention will be described with particularity in the claims annexed to and forming a part of the specification.

Figure 2:
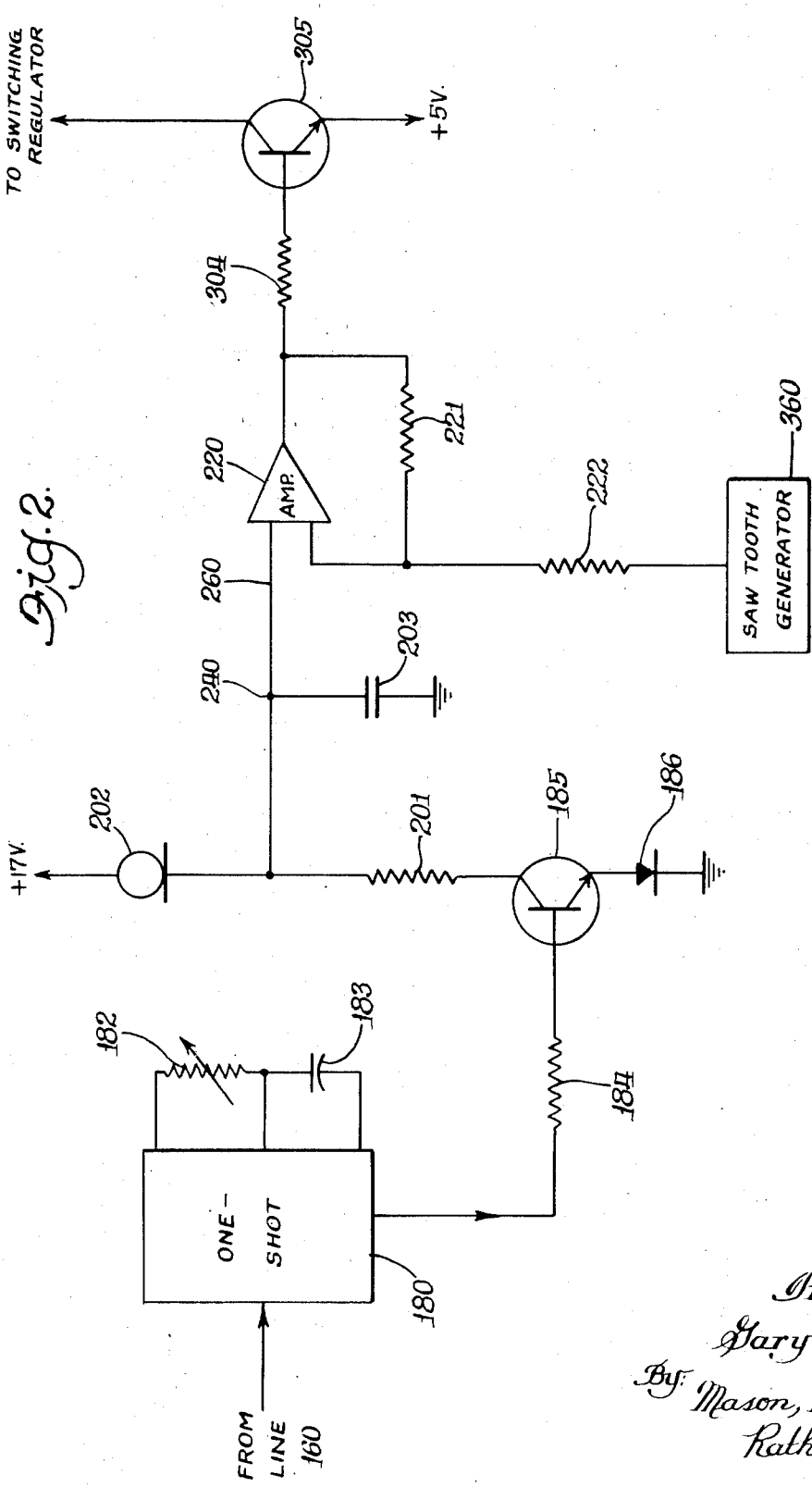

For a better understanding of the invention, reference will now be made to the drawings wherein:

FIG. 1 is a schematic diagram of a motor speed control circuit designed in accordance with the present invention; and FIG. 2 is a schematic diagram showing a modification that can be made in the circuit shown in FIG. 1.

Referring now to the drawing, a motor speed control circuit embodying the present invention is indicated generally by the reference number 100. The circuit 100 provides the proper signal to a motor 120 so as to maintain constant the rotational velocity of the motor 120. A rotary sensor 140 generates pulses whose spacing is inversely proportional to the velocity at which the motor 120 rotates. These pulses appear on a line 160. A one-shot multivibrator 180 converts this pulse signal into an inverted pulse width modulated signal that is partially integrated by a low-pass filter or integrating circuit 200. A differential amplifier 220 then compares the output of the integrator 200 which appears at a node 240 to a 5 volt reference signal which appears at a node 260. The output of the differential amplifier 220 appears at a node 280 and is fed into a switching regulator 300. The output of the switching regulator 300 is passed through a low pass filter 320 to the motor 120. A current sensing circuit 340 detects any overload currents in the motor 120 and shuts down the switching regulator 300 whenever such currents are encountered.

Assume that the motor speed control system 100 has just been energized, and that the motor 120 is starting up from a dead stop. The rotary sensor 140 generates pulses which appear on the line 160 and which are initially spaced far apart in time. The one-shot multivibrator 180 generates a narrow negative output pulse each time it receives a pulse from the line 160. The output of the one-shot multivibrator 180 is filtered or integrated by the low-pass filter or integrating circuit 200, and a DC potential appears at the node 240. This potential is sufficiently positive to cause the differential amplifier 220 to continuously generate a positive output signal at the node 280 and maintain the switching regulator 300 in a continuously conductive state. Current is allowed to continuously flow from a power supply line 360 through the switching regulator 300 and the low-pass filter 320 and into the motor 120. Hence, the motor 120 is continuously energized until it reaches a velocity close to its proper operating velocity.

When the rotational velocity of the motor 120 is close to its proper operating velocity, the pulses on the line 160 are close enough together to cause negative going output pulses generated by the one-shot multivibrator 180 to form a pulse width modulated rectangular signal. The integrating circuit 200 converts this pulse width modulated signal into a composite signal that includes a DC component inversely proportional in magnitude to the velocity of the motor 120, and a low amplitude triangular waveform which is the integral of the AC portion of the pulse width modulated signal. When the DC component at the node 240 reaches a sufficiently negative potential level, the negative peaks of the triangular waveform drive an input terminal of the differential amplifier 220 negative with respect to the remaining input of the differential amplifier 220, and this causes the node 280 to go negative each time a peak in the triangular waveform appears at the node 240. Hence, a rectangular pulse width modulated signal now appears at the node 280. As the velocity of the motor 120 increases, greater portions of the triangular waveform are able to bias one input terminal of the differential amplifier 220 negatively with respect to the other input terminal and, therefore, a greater and greater percentage of the output waveform at the node 280 is at ground level. This output waveform controls the switching regulator 300 by determining the percent of the time during which the switching regulator 300 is conductive. The low-pass filter 320 then filters switching transients from the signal developed by the switching regulator 300 and applies a substantially constant DC potential to the motor 120. The amplitude of this DC potential is proportional to the rotational velocity of the motor 120. If the motor velocity increases still farther, a point is reached at which the triangular waveform maintains the one input terminal always negative with respect to the other input terminal. Then the node 280 is continuously held at ground potential and the switching regulator 300 is continuously turned off. This totally deprives the motor 120 of operating current and allows it to slow down.

An advantage of the above circuit is that the switching regulator 300 is shifted all the way from a state of continuous conduction to a state of continuous nonconduction by a relatively small change in the velocity of the motor 120. In most conventional arrangements utilizing a switching regulator, the switching regulator begins to deprive the motor of energy as soon as the motor begins to rotate, and thus deprives the motor of accelerating power and extends the time it takes the motor to reach its proper operating velocity. The motor 120 is continuously supplied with full power until its velocity of rotation is very close to the proper velocity. The circuit 100 thus brings the motor 120 up to operating speed as rapidly as it is possible to do. When the motor reaches its proper speed, the circuit 100 provides far more sensitive velocity regulation than a conventional switching regulator system. Since the switching regulator 300 changes from supplying very little current to the motor 120 to supplying almost maximum current to the motor 120 for a very small change in the speed of rotation of the motor 120, a large load can be applied to the motor 120 with only a minimal speed change in the motor 120. Unlike phase lock systems, there is no switchover period during which frequency control is replaced by phase lock control, and therefore no problems of improper phase lock or hunting are encountered with this circuit. No external frequency standard is required.

Since the differential amplifier 220 is relatively immune to changes in temperature, the circuit 100 is able to operate over an extremely wide temperature range without any significant change in the motor speed. The circuit described above has been found able to maintain motor speed within plus or minus 2 percent over a temperature range of −60° F. to +250° F. with a load variation from 0 to 40 ounce-inches.

The motor 120 is a DC motor of a type suitable for use in a teleprinter apparatus. The motor 120 drives a rotary device 140 which, for example, might comprise a toothed ferromagnetic wheel 141 mounted adjacent a magnetic pickup coil 142. The signals developed in the magnetic pickup coil 142 are amplified and converted into a square wave by an operational amplifier 143. Resistors 144 and 145 bias an input to the amplifier 143 midway between the supply potential levels, and a capacitor 146 improves the waveform by impedance matching the pickup coil to the amplifier. A zener diode 147 connected in series with a resistor 148 connects the output of the amplifier 143 to the base of a transistor 150. The emitter of the transistor 150 is grounded, the base is connected to ground by a resistor 149, and the collector is connected to the line 160. The collector is also connected to a +5 volt supply potential by a resistor 151. A capacitor 152 connects the line 160 to ground and suppresses ringing and/or transients in the line 160.

The line 160 connects to the integrated circuit one-shot multivibrator 180. The signal is fed into an input terminal of the integrated circuit one-shot 180. Each time a negative transition occurs in the signal on the line 160, an output pulse appears at an output terminal of the one-shot circuit 180. The length of this output pulse is determined by values of a one-shot timing resistor 182 and a capacitor 183 connected to timing terminals of the one-shot 180. The resistor 182 is variable, and serves as a motor speed control adjustment. The signal from the one-shot output is fed through a resistor 184 to the base of a transistor 185. The emitter of the transistor 185 is connected to ground by a forward biased diode 186, and to a supply voltage by a resistor 187, and is thus biased slightly positive with respect to ground. The output signal from the transistor 185 collector is applied to the base of a transistor 188. The collector of the transistor 188 connects to the integrating circuit 200. A resistor 189 is connected in series with the collector of the transistor 185 to limit the current which flows into the base of the transistor 188 to a safe value, and to reduce heating of the transistor 185. A resistor 190 biases the base of the transistor 188 normally positive, and prevents the leakage current of the transistor 185 from flowing into the base of the transistor 188. The emitter of the transistor 188 is connected to a node 191 that has a potential of roughly 15 volts. The node 191 is connected to a 5-volt reference source by a zener diode 193 having a breakdown potential of roughly 10 volts, and to a positive supply node by a resistor 192.

The low-pass filter or integrating circuit 200 includes an input resistor 201, a current source such as a resistor or constant current diode 202, and an integrating capacitor 203. One end of the capacitor 203 is grounded, and the other end is connected to the integrator output node 240. The node 240 is connected to ground by the constant current diode 202, and to the collector of the transistor 188 by a resistor 201. Serially connected diodes 204 through 206 connect the node 240 to a 5-volt supply voltage and thus prevent the potential on the capacitor 203 from going excessively positive of the level at which the differential amplifier 220 holds the electronic switch 300 continuously conductive. This prevents the capacitor 203 from being charged excessively positive when the motor 120 is stopped, and also keeps the potential at the input of the differential amplifier 220 within 1.5 volts of the potential at the other input, as required by the maximum ratings of the amplifier 220.

When the motor 120 is not operating, the transistors 185 and 188 conduct continuously, maintaining the capacitor 203 fully charged. During normal operation of the motor 120 the transistor 188 conducts and ceases conduction as required by the inverted pulse width modulated output of the one-shot 181. The resistor 201 adds current to the capacitor 203 during those time intervals when the transistor 188 conducts, and the capacitor 203 is discharged by the constant current diode 202 continuously. The magnitudes of the resistor 201, of the diode 202, and of the capacitor 203 are selected in accordance with resistor 182 and capacitor 183 to provide the desired sensitivity and stability of the circuit. Under normal circumstances, the alternate conduction and nonconduction of the transistor 188 cause the capacitor 203 first to be charged slightly by current flow through the resistor 201 which exceeds current flow through the diode 202, and then to be discharged slightly by current flow through the diode 202. The result is that a low amplitude triangular potential appears at output node 240 superimposed upon a DC potential that is inversely proportional to the rotational velocity of the motor.

The signal from the output node 240 is applied to a noninverting input terminal of the differential amplifier 220 through a resistor 222, and a 5-volt reference potential is applied to an inverting input terminal. A resistor 221 then couples the differential amplifier output node 280 to the noninverting input so as to provide positive feedback. This arrangement gives a clean rectangular waveform at the output node 280. The differential amplifier 220 toggles and functions as a high gain comparator circuit comparing the potential at the mode 240 to the +5-volt reference potential. Whenever the potential at the node 240 is sufficiently negative with respect to the +5-volt reference potential, the output node 280 of the differential amplifier 220 goes to ground. Whenever the potential at the node 240 is sufficiently positive with respect to the +5-volt reference potential, the output node 280 of the differential amplifier 220 goes positive. The sawtooth component at the node 240 should be sufficiently large in magnitude to overcome the Schmitt trigger offset potential that results from the positive feedback arrangement described above.

Although any suitable switching means can be used, a switching regulator 300 is used in the two embodiments shown. The switching regulator 300 is shown to include a series regulating transistor 301 that is connected between the low pass filter 320 and a positive supply node 360. The potential at the node 360 need not be regulated, and in the preferred embodiment this potential is allowed to vary from 22 to 36 volts. A transistor 302 has its emitter connected to the base of the transistor 301 and its collector connected to the collector of the transistor 301. The transistor 302 thus serves as a beta amplifier for the transistor 301. A resistor 303 interconnects the base and emitter of the transistor 301 and thereby minimizes leakage current through the transistor 301. Signals from the node 280 are fed through a resistor 304 to the base of a transistor 305 that has its emitter connected to a 5-volt source of potential. The collector of the transistor 305 is connected by a resistor 306 to the base of the transistor 302, and a resistor 307 connects the base of the transistor 302 to the positive supply node 360 thereby preventing leakage currents from flowing out of the transistor 305 and into the base of the transistor 302.

When the output node 280 is at ground potential, the transistor 305 is rendered nonconductive, and the resistor 307 biases the transistor 302 nonconductive. The resistor 303 then prevents any current from flowing through the transistor 301, and no current flows to the low-pass filter 320. When the output node 280 is positive, current flow through the resistor 304 causes the transistor 305 to become fully conductive. Current flow from the collector of the transistor 305 flows into the base of the transistor 302 and renders it fully conductive. Current flow through the emitter of the transistor 302 then flows into the base of the transistor 301 and renders it fully conductive. The transistor 301 connects the low pass filter 320 directly to the positive supply node 360. If the motor 120 is running underspeed, the switching regulator 330 conducts continuously, and current flows freely from the node 360 into the low-pass filter 320. If the motor 120 is running overspeed, the node 280 is continuously held at ground potential and the switching regulator 300 supplies no current to the motor 120. When the motor 120 is running at approximately the proper operating speed, a pulse width modulated rectangular waveform appears at the output node 280 which causes the transistor 301 to rapidly shift between conduction and nonconduction. The rectangular waveform is thus applied to the low pass filter 320. The transistor 301 is either nonconductive or fully conductive. At any moment the transistor 301 either carries no current, or has very little voltage across its terminals, and in either case it dissipates very little energy. Hence, the efficiency of the switching regulator 300 is high.

The low-pass filter 320 comprises an inductor 321 that connects the collector of the transistor 301 to one terminal of the motor 120. Electrolytic capacitors 322 and 323 are connected between this same terminal of the motor 120 and ground to further improve the filtering action of the inductor 321. The purpose of the inductor 321 is to convert the rectangular switching waveform supplied by the transistor 301 into a constant current for the motor 120. This current has an amplitude proportional to the percentage of time that the switching regulator 300 is conductive. When the transistor 301 is fully conductive, it connects the inductor 321 directly between the positive supply node 360 and a terminal of the motor 120. Since the current in an inductor is proportional to the time integral of the potential across its terminals, momentary application of potential to the inductor 321 causes the current flow through the inductor to increase slightly in magnitude. When the transistor 301 becomes momentarily nonconductive, it cannot cut off the flow of current through the inductor 321 because the magnetic field associated with this inductor 321 cannot collapse so rapidly. The current therefore flows through a diode clamp 325 which is connected between ground and the collector of the transistor 301. The diode clamp 325 is oriented to conduct when the inductor 321 attempts to drive the collector of the transistor 301 negative with respect to ground. A positive voltage continuously appears across the motor 120. Therefore, during time intervals when the transistor 301 is nonconductive a negative voltage appears across the inductor 321. This negative voltage causes current flow through the inductor 321 to decrease slightly in magnitude. When the voltage across the motor 120 is such that the current increase caused by conduction of the transistor 301 is balanced out by the current decrease caused by nonconduction of the transistor 301, a balanced condition is obtained at which the motor 120 is supplied with a constant current whose amplitude is proportional to the percentage of time during which the transistor 301 conducts. Hence, the pulse width modulated rectangular waveform at the output node 280 is directly converted to a current that controls the speed at which the motor 120 rotates. A resistor 324 adjusts the damping of the low-pass filter 320 and gives the required degree of damping to operation of the filter.

The remaining terminal 130 of the motor 120 is connected to ground by a resistor 341 which can be varied to adjust the maximum current that is permitted to flow through the motor 120. This terminal is also connected to the base of a transistor 342 by a resistor 343. The transistor 342 limits current flow through the motor 120 by rendering the switching regulator 300 nonconductive whenever the current flow through the motor 120 becomes excessive. The emitter of the transistor 342 is grounded, and the collector of the transistor 342 is connected to the base of the transistor 305. When the motor 120 draws excessive current, the terminal 130 goes positive sufficiently to allow current flow through the resistor 343 to cause conduction in the transistor 342. The transistor 342 draws current through the resistor 304 and biases the base of the transistor 305 negatively with respect to its emitter. This turns off the switching regulator 300.

Positive high frequency feedback from the output of the filter 320 to the base of the transistor 340 increases the gain of the current limiting circuitry and greatly reduces the ripple level during the constant current mode of operation. This feedback flows through the serial combination of a capacitor 344 and a resistor 346 that are connected from the supply side of the motor 120 to the base of the transistor 342.

To provide a convenient means for stopping the motor 120, a diode 350 is connected between a motor stop signal and the integrator output node 240. This diode is oriented so that when the motor stop signal goes to ground, it pulls the node 240 to ground thereby biasing the one input terminal of the differential amplifier 220 in such a manner that the output node 280 remains continuously at ground potential and thus prevents any current flow to the motor 120. When the motor stop signal is terminated, the motor speed control resumes its normal mode of operation.

FIG. 2 shows a way in which the basic circuit shown in FIG. 1 can be improved by the addition of an external sawtooth or triangle wave generator 360. The transistor switch 188 is omitted, so the resistor 201 connects the node 240 to the collector of the transistor 185. The constant current diode 202 is then connected between the node 240 and a positive source of potential. The integrating capacitor 203 still connects the node 240 to ground. The resistor 222 is not connected to the node 240, but is connected to the sawtooth output of the sawtooth generator 360. The inverted signal input 260 to the amplifier 220 is connected to the node 240, rather than to a reference potential source.

The modified circuit shown in FIG. 2 functions in essentially the same manner as the circuit shown in FIG. 1, except the DC signal at the node 240 is reversed in polarity and is therefore applied to the inverted signal input of the amplifier 220, and the triangle or sawtooth wave is generated by the external generator 360 rather than by an integrating circuit. This modified arrangement makes it possible to provide any desired chopping frequency for the switching regulator by setting the frequency of the generator 360 equal to the desired chopping frequency.

A high-frequency sawtooth or triangle wave generator can be chosen, and then the inductor 321 (FIG. 1) and the capacitors 322 and 323 can be reduced in size proportionally. A low or medium frequency can still be used to drive the one-shot 180, since this one-shot 180 driving frequency is now unrelated to the chopping frequency supplied to the switching regulator 300. Additionally, the higher more stable chopping rate introduces less noise into the unregulated (+22 to +36) motor current supply line, and eases the problems of radio frequency interference suppression.

The triangle or sawtooth generator 360 must generate a signal whose peak-to-peak amplitude is at least sufficient to overcome the hysteresis produced by the feedback resistor 221 to insure that a pulse width modulated waveform is generated by the amplifier 220. Additionally, the DC component of the signal generated by the generator 360 determines the speed at which the motor runs, and hence should be stable. The motor runs at whatever speed produces a potential at the node 240 that is approximately equal to the DC potential provided by the generator 360.

The sensitivity and stability of the circuit in FIG. 2 is determined in part by the amplitude of the triangle or sawtooth waveform. A larger amplitude waveform gives improved circuit stability, while a smaller amplitude waveform gives increased sensitivity and improved regulation.

The particular types and values of components for use in the above circuits will vary depending upon the particular application and the particular mode of operation desired. An integrated circuit suitable for use as amplifiers 143 and 220 is Fairchild number μA 741, and one suitable for use as the retriggerable monostable multivibrator 180 is Fairchild number μL 9601. These may be obtained from the Semiconductor Division of Fairchild Camera and Instrument Corporation, Mountain View, California. A suitable constant current diode for use as element 202 is number 1N 5289 sold by Motorola Semiconductor Products Incorporated, Phoenix, Arizona.

What is claimed as new and desired to be secured by Letters Patent of the United States is:

1. A motor speed control circuit comprising:
   means for generating a first signal whose frequency is proportional to the motor speed of rotation;
   a one-shot multivibrator having said first signal as an input and having an output at which an output signal containing periodic pulses appears each time said first signal fluctuates;
   integrating or low-pass filtering means for partially integrating or filtering the output signal of the multivibrator to produce a composite signal including a direct current component proportional to the average DC value of the periodic pulses and having a short enough time-constant so that a substantial triangular component appears in the composite signal;
   a differential amplifier having one input connected to the composite signal generated by said integrating means, having a second input connected to a reference potential, and having an output; and
   a switching circuit having an input connected to said differential amplifier output and having an output connected to the motor.

2. The motor speed control circuit in accordance with claim 1 wherein the signal generating means comprises:
   an amplifier having an input and having an output at which said first signal appears;
   a coil connected to the input of said amplifier; and
   a rotating device affixed to the shaft of said motor, said device containing spaced magnetic elements about its periphery and positioned adjacent said coil.

3. A motor speed control circuit in accordance with claim 1 wherein the one-shot generates a continuous, unbroken output signal whenever the fluctuations in said first signal are more closely spaced than the duration of said output.

4. A motor speed control circuit in accordance with claim 1 wherein the integrator comprises:
   an integrating capacitor having a first terminal connected to a reference potential and having a second terminal;
   a resistor connected between said second terminal of the integrating capacitor and a reference potential; and
   resistance means connecting the second terminal of said capacitor to the output of said multivibrator.

5. A motor speed control circuit in accordance with claim 1 wherein the integrator comprises:
   an integrating capacitor having a first terminal connected to a reference potential and having a second terminal;
   a current source connected between said second terminal of the integrating capacitor and a reference potential; and
   resistance means connecting the second terminal of said capacitor to the output of said multivibrator.

6. A motor speed control circuit in accordance with claim 1 wherein the differential amplifier has a noninverting input connected to the output of said integrator and an inverting input connected to the reference potential, and further includes a positive feedback circuit path connecting the differential amplifier output to the noninverting input.

7. A motor speed control circuit in accordance with claim 1 wherein the differential amplifier operates as a Schmitt trigger.

8. A motor speed control circuit comprising:
   means for producing a periodic signal that fluctuates at a rate proportional to the rotational velocity of the motor;
   pulse generating means for generating periodic pulses of fixed time duration each time the periodic signal fluctuates;
   integrating or low-pass filtering means for partially integrating or filtering the periodic pulses to produce a composite signal including a direct current component proportional to the average DC value of the periodic pulses and having a short enough time-constant so that a substantial triangular component appears in the composite signal;
   comparator means having an output for comparing the composite signal to a reference potential and for generating a motor control signal that is at a first level when the composite signal exceeds the reference potential and at a second level when the reference potential exceeds the composite signal; and
   switching means connected to the motor for supplying current to the motor only when the motor control signal is at a predetermined level.

* * * * *